March 19, 1957  H. L. FERVERDA  2,786,006
METHOD OF MAKING A LAMINATED CORE
Filed July 25, 1955  2 Sheets-Sheet 1

Inventor:
Harold L. Ferverda,
by
His Attorney.

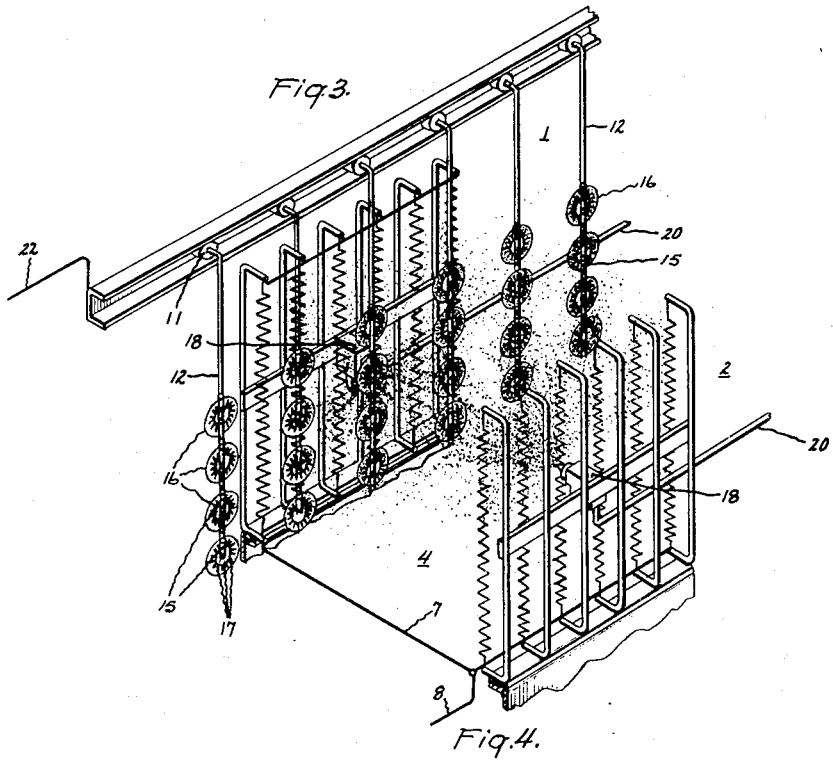

United States Patent Office 2,786,006
Patented Mar. 19, 1957

2,786,006

METHOD OF MAKING A LAMINATED CORE

Harold L. Ferverda, Fort Wayne, Ind., assignor to General Electric Company, a corporation of New York Application July 25, 1955, Serial No. 524,040

17 Claims. (Cl. 154—80)

This invention relates to electrical apparatus, and more particularly to a novel method of making a laminated core member for use in such apparatus.

It is a well-known fact that in electrical apparatus, of the type including induction devices such as transformers, and dynamoelectric machinery, such as motors, it is necessary to provide a core member of magnetic material as a path for the magnetic fluxes produced. These core members, particularly those intended for use in alternating current apparatus, have invariably been found to provide better performance when they are made up of a plurality of thin superimposed laminations. Such a structure, however, presents certain problems as to assembly of the individual laminations and the maintenance thereof in a stack as a unit because present methods of assembly do not provide the stack with the desired mechanical strength. It is most desirable to provide a method of making a laminated core member wherein the laminations are secured together so that the stack has higher mechanical strength than most present constructions. It is further desirable to provide a method of making a core member wherein the insulation between the core member and the windings which are to be placed thereon is formed in the same operation as the securing together of the laminations. It is, of course, also a requirement that such a method be economical and simple.

It is, therefore, an object of this invention to provide an improved method of making a laminated core member which will include the desirable features set forth above.

Further objects and advantages of this invention will become apparent and the invention will be better understood by reference to the following description and the accompanying drawings, and the features of novelty which characterize this invention will be pointed out with particularity in the claims annexed to and forming a part of this specification.

In its broadest aspect, this invention provides a four-step method of making cores for electrical apparatus. In the first step, grounded individual laminations are passed through an electrostatic field and solid particles of insulating and bonding resin are introduced into the field to coat the laminations. Each lamination is then heated so as to melt at least the outer surface of the particles coating it. The laminations are then stacked to a predetermined height so as to form a core and, in the last step, are then heated either merely to melt the resin where it is of the thermoplastic type or to melt and cure it where it is of the thermosetting type.

In the drawings,

Figure 3 is a view in perspective of equipment provided to effect yet another modification of the first step of the process of this invention; and Figure 4 is a diagram setting forth in sequence the four basic steps of the invention.

Figure 1:
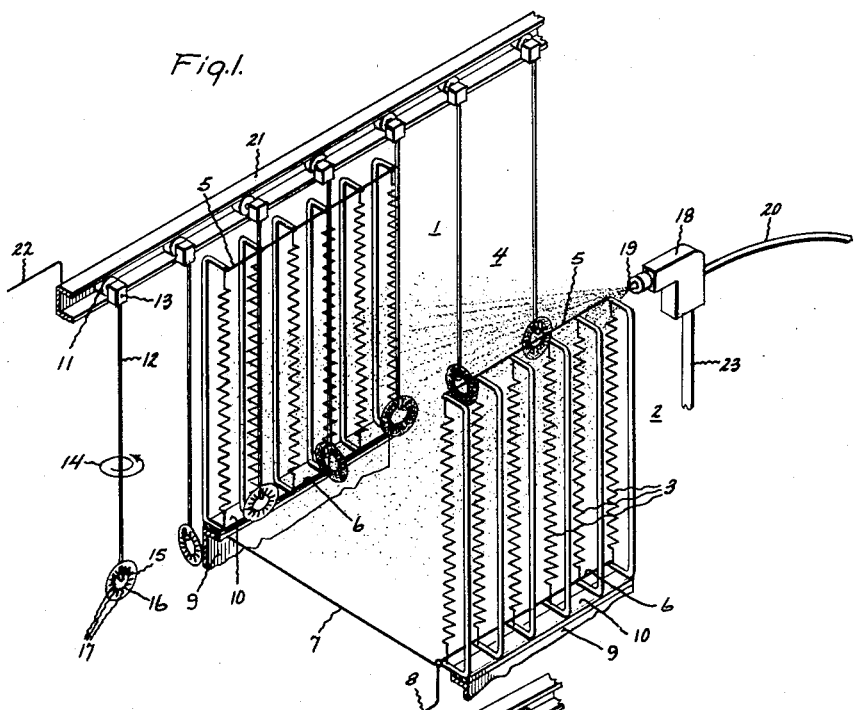
Figure 1 is a view in perspective of equipment provided to effect the first step of the improved method of this invention.

Referring now to Figures 1 and 4 of the drawings, the first embodiment of the improved method will be described. Two grid sections 1 and 2, each consisting of a plurality of grid members 3, are arranged so as to define between them and area 4. The individual grid members 3 of each group are interconnected, as shown at 5 and 6, and the two sections are connected together by a conductor 7. A conductor 8 is electrically connected to one grid section 2 and is adapted to be connected to the negative side of a source of direct current power so as to maintain the grid sections at a relatively high voltage. While various voltages may be used, it has been found that optimum results are obtained in the range of 60,000 to 100,000 volts. A majority of the tests run by the inventor included a grid voltage of 70,000 volts, and highly satisfactory results were obtained. The grid sections 1 and 2 may be each supported on a supporting member 9 with adequate insulation 10 arranged between the supports 9 and the grid sections 1 and 2 to preclude grounding of the grid sections. It will be clear to those familiar in the art that with such an arrangement an electrostatic field may be created in the area 4 for a purpose hereinafter described. A guide rail 21 is arranged to support a plurality of rolling members 11, each of which is connected to a rod 12 through a part 13 which may be arranged to cause rod 12 to rotate in the direction shown by arrow 14 as roller 11 moves to the right along rail 21. Each rod 12 has a hook member 15 formed at the bottom thereof, and supported on the hook is a single lamination 16 of a magnetic material. In the present instance, the lamination shown is designed for use as part of the stator of a dynamoelectric machine (not shown), and it will be seen that slots 17 have been provided for windings to be placed in the core formed of the laminations 16. Rail 21, roller 11, rod 12, and part 13 are all formed of conductive material, and the rail 21 is connected to the positive side of the source of direct current power by line 22 so that in effect each of the laminations 17 is connected to the positive side of the power source. For safety's sake, rail 21 is preferably grounded (not shown), but it will be clear that such grounding forms no part of the invention but is a standard precaution.

A gun-type spray device 18 having a nozzle 19, and connected to a source of compressed air (not shown) through a pipe 20 and to a source of finely divided material (not shown) through another pipe 23, is arranged as shown so as to spray the material through its nozzle in a direction generally parallel to the travel of the laminations 16 through the electrostatic field 4. It will, however, be understood that while a gun-type arrangement 18 has been shown, any type of apparatus capable of spraying finely divided particles may be used to equal advantage. When the particles enter the electrostatic field 4, they are attracted to the laminations, which represent the positive side of the line, or the anode. Each lamination is thus coated with an amount of material which depends primarily on the amount being sprayed by device 18, the strength of the electrostatic field 4 as determined by the voltage applied between lines 8 and 22, the speed at which the laminations are moved along track 21 through the field 4, and the position of the laminations as they pass through the field. The material sprayed through the device 18 is a resin, solid at the temperatures at which the spraying operation is performed and at which the finished electrical core will be utilized, and having the desired insulating and bonding qualities, which has been divided into relatively fine particles. It has been discovered that particles which will pass through a 60 mesh screen are of small enough size and sufficiently economical to be commercially desirable. However, it will be understood that larger particles may be used on occasion, and that the upper size of the particles is determined primarily by their weight since at a certain size they will start to fall to the ground rather than remain in suspension in the electrostatic field. The weight, in turn, depends upon the particular material used. The same in general is true as to the lower limitation on the size of the particles, since the particles may be divided as finely as desired and will still coat the laminations properly. However, at a certain size the danger of an explosion may become a material factor and it will therefore be understood that it is desirable not to reduce the particles to such a size.

It is necessary that the material used be solid at the temperature at which the first step of the process is conducted since otherwise the material will tend to bead at the bottom of each lamination, and, more important, will make the laminations exceedingly difficult to handle subsequently. One such type of material, which also has the desired features of insulation, bonding, and melting at a relatively high temperature, is found in the epoxide resins. There are several commercially available resins from this group which include all the desired features. However, the process is not limited to resin particles from the epoxide group; for instance, another type of resin which has been found to perform desirably includes several commercially available members of the family of chlorinated polyphenyl resins, and, where only relatively low temperatures will be encountered in the operation of the electrical core member, ordinary powdered shellac may be used as the insulating and bonding resin.

The first type of material mentioned above (the epoxide resins) is thermosetting, i. e., once they have been cured by sufficient heating they will remain solid, no matter what temperatures they are subsequently subjected to, until they are destroyed. The chlorinated polyphenyl resins and the shellac, on the other hand, are thermoplastic, i. e., they will always soften when heated to a predetermined temperature. While the broad concept of the process is independent of which type of resin is used, it will be recognized that each type has certain advantages over the other when used in the process. Thus, thermosetting materials can be used regardless of the temperature at which the electrical core is used, up to the temperature at which the material is destroyed; on the other hand, while thermoplastic materials must be selected so that the melting temperature is well above that at which the electrical core will be used, the manufacturing process may be simpler since it is not necessary to cure the material by application of heat for a predetermined time, but only to supply enough heat to melt it.

It will be recalled that the rods 12 are caused to rotate as they pass through the electrostatic field 4. However, while this will provide a particularly good coating on each lamination in combination with the particular position of the spraying apparatus (as shown in Figure 1), it is to be understood that the process is not limited to the combination of these particular factors. The spraying apparatus may be arranged as shown without rotation of the rods 12 and will provide results which, although not as good, are yet satisfactory.

After the laminations have been coated as described above, they are exposed to heat so as to cause at least partial melting of the outer surface of the particles and are then allowed to cool so that the resin forms a substantially solid coating on each lamination. While different temperatures in combination with different periods of time may be used, and therefore there is nothing critical about that particular feature, it has been found that raising the ambient temperature of the laminations to approximately 100° C. for about fifteen seconds will provide satisfactory melting of the outer surface of the particles in at least the epoxide resins set forth as examples above and for some members of the chlorinated polyphenyl resin group. However, for different resins the temperature and time will vary, and the important thing is that sufficient heat be absorbed by each particle so that the surface of each particle rises above the melting point of the resin but that the heat be insufficient to cure the resin.

After the second step, the individual laminations are stacked together to the desired height to form a core. This may be effected in any desired manner. For instance, with laminations such as those shown in Figure 1, a rod provided with alignment guides (not shown) may be provided and the laminations stacked on the rod until a proper height is reached. If desired, pressure may be applied so as to insure proper alignment and close contact of the laminations. However, experimentation has also shown that no pressure at all will still provide a satisfactory core.

For the fourth step, the laminations may be maintained under the same pressure as for the previous step, or, if so desired, other pressures, or even no pressure, may be provided. In the case of thermosetting resins, they are then heated so that the resin is cured and fuses into a solid unmeltable mass. This may be effected, in connection with the epoxide resins mentioned, by baking at 190° C. for about one and a half hours. Again, however, the temperature and time may be varied for any one particular type of resin, and both will differ when different types of resins are used. The important thing with thermosetting resins is that sufficient heat be applied to the stacked laminations to cure the resin. In the case of thermoplastic resins, they are heated so that the resin is melted; when the resin cools, the laminations are then bonded together by a material which, at the temperatures to be encountered during use, is unmeltable. There are many thermoplastic insulating and bonding materials, with melting points far above the normal temperatures reached by electrical equipment during use, which may be selected.

Figure 2:
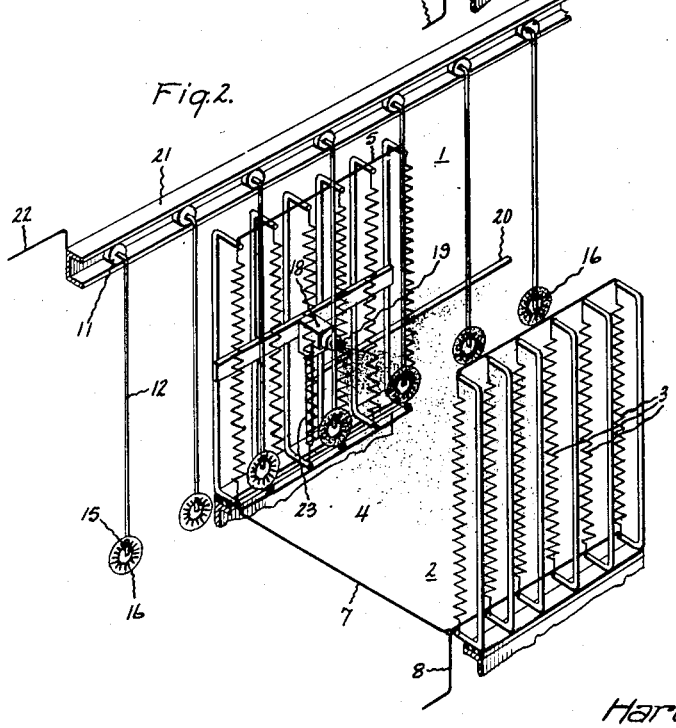
Figure 2 is a view in perspective of equipment provided to effect a modification of the first step of this invention.

Referring now to Figure 2 of the drawings, the principal difference from the arrangement of Figure 1 lies in the fact that the spraying gun 18 has been moved so that its nozzle 19 sprays the particles of resin into the field 4 at approximately right angles, i. e., perpendicular, to the direction of travel of the lamination 17 through the field. With this arrangement, it is not necessary that the laminations be rotated as they pass through the field in order to obtain optimum results; instead, best results are obtained when the laminations are so arranged on the hooks that they lie in a plane which is substantially perpendicular to the direction in which the particles are sprayed into the field. Again, however, it will be understood that while the best results are obtained with the laminations precluded from rotation and arranged as set forth above, satisfactory results may be obtained with the laminations in any position as they pass through the field 4.

Referring now to Figure 3 which sets forth another modification of step 1 of the present invention, each of the rods 12 is provided with a plurality of hooks 15 (four in the present instance) so that a plurality of laminations 16 may be arranged on each rod. In addition, a material-spraying device 18 is provided on each side of the field 4, both of the devices spraying material at right angles to the direction of movement of the laminations. It has been discovered that, when two guns or spraying devices 18 are provided in this arrangement, a plurality of laminations may be arranged on each rod 12 with excellent results. While it is possible to secure a plurality of laminations on each rod 12 in the embodiments of Figures 1 and 2, if sufficient hooks 15 are provided, the result is not as satisfactory as where a single lamination is suspended from each rod. However, in the embodiment of Figure 3, the provision of the two guns with one on each side of the field provides excellent coating of all the laminations.

It will be seen from the foregoing that this invention provides a method of making cores for electrical apparatus which is novel and economical. Furthermore, the invention provides cores of great mechanical strength, while at the same time providing them with a coating of insulation so that windings may be applied without any need for additional insulation.

While this invention has been explained by describing particular embodiments thereof, it will be apparent that improvements and modifications may be made without departing from the scope of the invention as defined in the appended claims.

What I claim as new and desire to secure by Letters Patent of the United States is:

1. A method of making cores for electrical apparatus comprising the steps of passing individual laminations connected to the positive side of a source of direct current power through an electrostatic field and introducing solid particles of insulating and bonding resin into the field thereby to coat said laminations, heating each lamination so as to melt the particles together, cooling the lamination so that the resin forms a solid coating, stacking said laminations to a predetermined height to form a core, and heating the stacked laminations to remelt said resin thereby to bond said laminations together.

2. A method of making cores for electrical apparatus comprising the steps of passing individual laminations connected to the positive side of a source of direct current power through an electrostatic field and introducing solid particles of thermosetting insulating resin into the field in a direction substantially parallel to the line of movement of the laminations thereby to coat said laminations, heating each lamination so as to melt the particles together without curing the resin, cooling the lamination so that the resin forms a solid coating, stacking said laminations to a predetermined height to form a core, and heating the stacked laminations to melt and cure said resin.

3. A method of making cores for electrical apparatus comprising the steps of passing individual laminations connected to the positive side of a source of direct current power through an electrostatic field and introducing solid particles of thermosetting insulating resin into the field thereby to coat said laminations, said laminations being rotated as they pass through the field, heating each lamination so as to melt the particles together without curing the resin, cooling the lamination so that the resin forms a solid coating, stacking said laminations to a predetermined height to form a core, and heating the stacked laminations to melt and cure said resin.

4. A method of making core for electrical apparatus comprising the steps of passing individual laminations connected to the positive side of a source of direct current power through an electrostatic field and introducing solid particles of a thermosetting insulating resin into the field thereby to coat said laminations, heating each lamination so as to melt the particles together without curing the resin, cooling the lamination so that the resin forms a solid coating, stacking said laminations to a predetermined height to form a core and heating the stacked laminations to melt and cure said resin.

5. A method of making cores for electrical apparatus comprising the steps of passing individual laminations connected to the positive side of a source of direct current power through an electrostatic field and introducing solid particles of a thermosetting insulating resin of the epoxide group into the field thereby to coat said laminations, said laminations being rotated as they pass through the field, said resin being introduced into the field in a direction opposite to and parallel with the line of motion of said laminations, heating each lamination so as to melt the particles together without curing the resin, cooling the lamination so that the resin forms a solid coating, stacking said laminations to a predetermined height to form a core, and heating the stacked laminations to melt and cure said resin.

6. A method of making cores for electrical apparatus comprising the steps of passing individual laminations between two sections of a grid maintained at 60,000 to 100,000 volts direct current, the grid being connected to the negative side of the direct current power source and the laminations being connected to the positive side thereof, introducing particles of a solid thermosetting insulating resin of the epoxide type between the grid sections thereby to coat said laminations, heating each lamination to approximately 100° C. for approximately 15 seconds, stacking said laminations to a predetermined height to form a core, and heating the stacked laminations at approximately 190° C. for approximately one and a half hours to melt and cure said resin.

7. A method of making cores for electrical apparatus comprising the steps of passing individual laminations connected to the positive side of a source of direct current power through an electrostatic field and introducing solid particles of a thermoplastic insulating resin into the field thereby to coat said laminations, heating each lamination so as to melt the particles together cooling the lamination so that the resin forms a solid coating, stacking said laminations to a predetermined height to form a core, and heating the stacked laminations to melt said resin thereby to bond said laminations together.

8. A method of making cores for electrical apparatus comprising the steps of passing individual laminations connected to the positive side of a source of direct current power through an electrostatic field and introducing solid particles of a thermoplastic insulating resin into the field thereby to coat said laminations, said laminations being caused to rotate as they are passed through the field, the resin being introduced into the field in a direction substantially parallel to the line of movement of said laminations, heating each lamination so as to melt the particles together, cooling the lamination so that the resin forms a solid coating, stacking said laminations to a predetermined height to form a core, and heating the stacked laminations to melt said resin thereby to bond said laminations together.

9. A method of making cores for electrical apparatus comprising the steps of passing individual laminations connected to the positive side of a source of direct current power through an electrostatic field and introducing solid particles of insulating and bonding resin into the field at substantially right angles to the direction of movement of said laminations thereby to coat said laminations, heating each lamination so as to melt the particles together, cooling the lamination so that the resin forms a solid coating, stacking said laminations to a predetermined height to form a core, and heating the stacked laminations to melt said resin thereby to bond said laminations together.

10. A method of making cores for electrical apparatus comprising the steps of passing individual laminations connected to the positive side of a source of direct current power through an electrostatic field and introducing solid particles of thermosetting insulating resin into the field at substantially right angles to the line of motion of said laminations thereby to coat said laminations, said laminations being maintained in a plane at substantially right angles to the direction in which said resin is introduced into the field, heating each lamination so as to melt the particles together without curing the resin, cooling the lamination so that the resin forms a solid coating, stacking said laminations to a predetermined height to form a core, and heating the stacked laminations to melt and cure said resin.

11. A method of making cores for electrical apparatus comprising the steps of passing individual laminations between two sections of a grid maintained at 60,000 to 100,000 volts direct current, the grid being connected to the negative side of the source of direct current power and the laminations being connected to the positive side thereof, introducing between the grid sections solid particles of thermosetting insulating resin of the epoxide type in order to coat said laminations, the material being introduced approximately at right angles to the line of motion of said laminations, said laminations being maintained at approximately right angles to the direction of introducing of the particles between the sections, heating each lamination at approximately 100° C. for 15 seconds so as to melt at least the outer surfaces of the particles, stacking said laminations at a predetermined height to form a core, and heating the stacked laminations at approximately 190° C. for approximately one and a half hours to melt and cure said resin.

12. A method of making cores for electrical apparatus comprising the steps of passing individual laminations connected to the positive side of a source of direct current power through an electrostatic field and introducing solid particles of a thermoplastic insulating resin into the field at approximately right angles to the direction of movement of said laminations to coat said laminations, said laminations being maintained at substantially right angles to the direction of introduction of the particles into the field, heating each lamination so as to melt the particles together, cooling the lamination so that the resin forms a solid coating, stacking said laminations to a predetermined height to form a core, and heating the stacked laminations to melt said resin thereby to bond said laminations together.

13. A method of making cores for electrical apparatus comprising the steps of passing individual laminations connected to the positive side of a source of direct current power through an electrostatic field and introducing solid particles of insulating and bonding resin into the field from each side of said laminations at approximately right angles to the direction of movement thereof so as to coat said laminations, heating each lamination so as to melt the particles together, cooling the lamination so that the resin forms a solid coating, stacking said laminations to a predetermined height to form a core, and heating the stacked laminations to melt said resin thereby to bond said laminations together.

14. A method of making cores for electrical apparatus comprising the steps of passing individual laminations connected to the positive side of a source of direct current power through an electrostatic field and introducing solid particles of thermosetting insulating resin into the field from both sides of said laminations at approximately right angles to the direction of travel thereof to coat said laminations, said laminations being maintained at substantially right angles to the direction of introduction of the particles into the field, heating each lamination so as to melt the particles together without curing the resin, cooling the lamination so that the resin forms a solid coating, stacking said laminations to a predetermined height to form a core, and heating the stacked laminations to melt and cure said resin.

15. A method of making cores for electrical apparatus comprising the steps of passing individual laminations between two sections of a grid maintained at 60,000 to 100,000 volts direct current, the grid being connected to the negative side of the source of direct current power and the laminations being connected to the positive side thereof, introducing solid particles of thermosetting insulating resin of the epoxide type into the field from both sides of said laminations at approximately right angles to the direction of movement thereof thereby to coat said laminations, said laminations being maintained at substantially right angles to the direction of introduction of the particles into the field, heating each lamination at approximately 100° C. for approximately 15 seconds so as to melt at least the outer surfaces of the particles, stacking said laminations to a predetermined height to form a core, and heating the stacked laminations at approximately 190° C. for approximately one and a half hours to melt and cure said resin.

16. A method of making cores for electrical apparatus comprising the steps of passing individual laminations connected to the positive side of a source of direct current power through an electrostatic field and introducing solid particles of a thermoplastic insulating resin into the field from both sides of said laminations at approximately right angles to the direction of movement thereof thereby to coat said laminations, said laminations being maintained at approximately right angles to the direction of introduction of the particles into the field, heating each lamination so as to melt the particles together, cooling the lamination so that the resin forms a solid coating, stacking said laminations to a predetermined height to form a core, and heating the stacked laminations to melt said resin thereby to bond said laminations together.

17. A method of making cores for electrical apparatus comprising the steps of passing individual laminations connected to the positive side of a source of direct current power through an electrostatic field and introducing solid particles of thermosetting insulating resin into the field from each side of said laminations at approximately right angles to the direction of movement thereof so as to coat said laminations, heating each lamination so as to melt the particles together without curing the resin, cooling the lamination so that the resin forms a solid coating, stacking said laminations to a predetermined height to form a core, and heating the stacked laminations to melt and cure said resin.

References Cited in the file of this patent

UNITED STATES PATENTS

| | | |
|---|---|---|
| 2,275,989 | Perry | Mar. 10, 1942 |
| 2,421,787 | Helmuth | June 10, 1947 |
| 2,483,024 | Roters | Sept. 27, 1949 |